Oct. 7, 1924.

K. KOBAYASHI

CLUTCH

Filed April 8, 1921

1,510,892

Inventor
K. Kobayashi
By Marks & Clerk
Attys.

Patented Oct. 7, 1924.

1,510,892

UNITED STATES PATENT OFFICE.

KOTARO KOBAYASHI, OF TOKYO, JAPAN.

CLUTCH.

Application filed April 8, 1921. Serial No. 459,928.

*To all whom it may concern:*

Be it known that I, KOTARO KOBAYASHI, a subject of the Emperor of Japan, residing at No. 35 Ishiwara Machi, Honjo Ku, Tokyo, Japan, have invented certain new and useful Improvements in Clutches, of which the following is a specification.

This invention relates to improvements in clutches for use with motor fire-engines and the particular object of the invention is to provide a clutch for use with fire-fighting apparatus mounted on an ordinary motor-cycle provided with a side car.

Another object of the invention is to provide a clutch for fire-engines of the above character, and power transmitting means for utilizing the motor of the cycle to drive the propeller wheel of the vehicle or a pump forming part of the fire-fighting apparatus.

Another object of the invention is to provide an improved clutch to permit the motor to drive either the propeller wheel or pump.

With the foregoing objects outlined and with other objects in view which will appear as the description proceeds, the invention consists in the novel features hereinafter described in detail, illustrated in the accompanying drawings and more particularly pointed out in the appended claim.

Referring to the drawings:—

Figure 1:
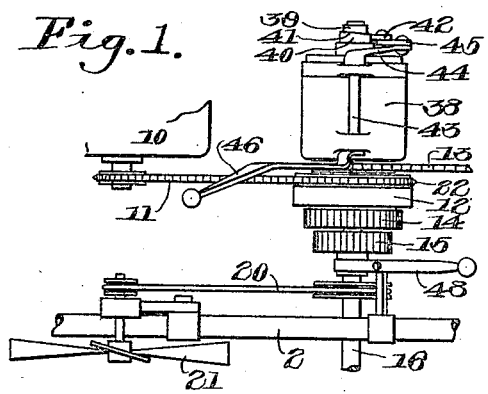
Fig. 1 is a plan view of a mechanism for transmitting power.

Referring to Fig. 1 of the drawing, 10 designates the motor of a motor cycle (not shown) and 2 is a portion of a side car frame. 11 designates an endless chain for transmitting power from the motor 10 to a wheel 22, which is fixed to revolve with a clutch casing 12 and a gear 14. From the clutch casing, the power is transmitted to the propeller wheel of the motor-cycle, by means of a change speed gear contained in a casing 38, and a chain 13. The power of the motor may also be transmitted to a shaft 16 which is parallel to and arranged below the shaft of the chain wheel 22, by means of toothed wheels 14 and 15. From the shaft 16, power is also transmitted by means of a chain 20, to a fan 21 arranged at one side of a motor. When the motor-cycle is travelling over the road, the motor is cooled by the draft created by the movement of the vehicle, but when the motor-cycle is halted, the fan 21 may be put in motion to cool the engine.

Figure 2:
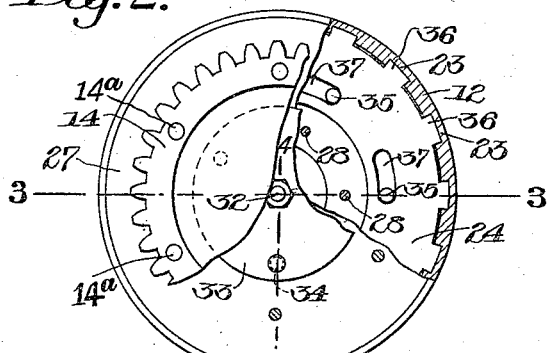
Fig. 2 is a side elevation, partly broken away, of a clutch which forms part of the power transmitting mechanism.
Figure 3:
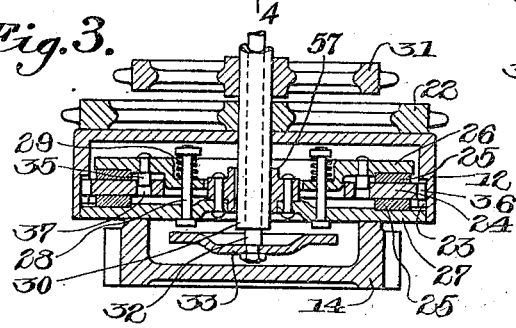
Fig. 3 is a diametrical sectional view of said clutch taken on line 3—3 of Fig. 2.
Figure 4:
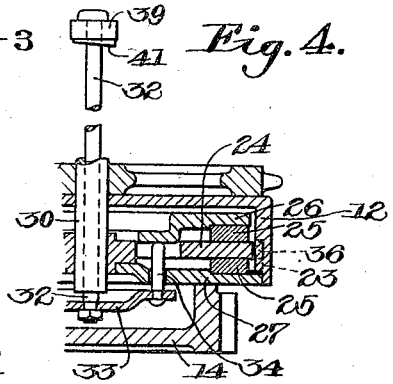
Fig. 4 is a similar sectional view of a portion of the clutch taken on line 4—4 of Fig. 2.

As shown in Figures 2, 3 and 4, the interior of the rim of the clutch casing 12 is serrated or notched at 23 to receive the teeth 36 of an annular ring 24. Disks 26 and 27 are arranged on opposite sides of this ring, and rings 25 of soft, yielding material are arranged between the ring 24 and the disks 26 and 27. These disks are connected together by a number of pins 28 provided with springs 29 which force the disks toward one another. The toothed wheel 14 is fixed by pins 14$^a$ to the disk 27. The common hub 57 of the disks is firmly secured to a tubular shaft 30, while the chain wheel 22 and the casing of the clutch 12 are rotatably mounted on said shaft. A rod 32 extends through said shaft and is provided at one end with a fixed disk 33 having a number of pins 34, which extend through holes in the disk 27 and ring 24 and impinge against the inner surface of the disk 26. The disk 26 is also provided on its inner surface with a number of projections or lugs 35 adapted to cooperate with slots or cavities 37 when the disk 26 is moved toward the ring 24. The rod 32 extends through the casing of the change speed gear and its end passes through a fixed ring 39 and a loose ring 40, the contact surfaces of which are helically inclined as at 41. The ring 40 is provided with an arm 42 connected by a link 45 to an arm 44 provided at one end of a rock shaft 43 having a control lever 46. If the lever 46 is pushed forward, (that is, toward the left in Fig. 1), the arm 42 will move upward and the ring 40 will turn to permit the ring 39 to move toward the casing 38. This movement allows the rod 32 to shift axially, so that the disk 33 on the other end of said rod will move away from the casing 38, and thus move the pins 34 away from the disk 26. When the pins 34 move away from the disk 26, the springs 29 will move the disk 26 toward the ring 24 and the lugs 35 will then enter the slots 37 and cause the disks 26 and 27 to rotate with the ring 24. On the other hand, if the lever 46 is pulled backward, (toward the right in Fig. 1), the ring 40 will revolve in an opposite direction and will push the ring 39 outwardly away from the casing 38, and as the ring 39 is fixed to the rod 32, said rod will be moved axially upwardly in Fig. 3, and the disk 33 will cause the pins 34 to move the disk 26 away from the ring 24 and compress the springs 29. At the same time the lugs 35 will be withdrawn from the slots 37.

When the parts are in such position that the lugs 35 engage the slots 37, the tubular shaft 30 and the gear wheel 14 will revolve with the clutch casing 12 and the wheel 22, so that the drive wheel of the motor-cycle may be driven from the motor. On the other hand when the lugs 35 are out of the slots 37, the shaft 30 and motor-cycle drive wheel are stationary.

I am aware that friction rings were used in a clutch before my invention, and that the mechanism shown in the accompanying drawings and designated 28, 29, 32, 33, 34, 39, 40, 41, 42, 43, 44, 45 and 46 for moving such friction rings, was also well known. However, greater power is required to operate a pump than to drive a motor-cycle, and if only friction is utilized, the clutch will slip, therefore in my invention both friction and interlocked means have been devised. When the lever 46 is moved forward, the friction between the disks 26 and 27 and the ring 24 increases, and at the same time the projections 35 catch in the slots 37 and thus prevent any slippage.

The toothed wheel 15 is keyed on the shaft 16 by means of a spline and groove, so that the wheel may slide along but cannot revolve relatively to said shaft. The wheel 15 may be shifted by means of a handle 48 pivoted to the frame at 47.

From the foregoing it is believed that the construction, operation and advantages of the invention may be readily understood by those skilled in the art, and it is apparent that changes may be made in the construction illustrated without departing from the spirit of the invention as expressed in the claim.

I claim—

In combination, a clutch casing provided with internal teeth, a ring arranged in the casing and having peripheral teeth engaging the teeth of the casing, friction rings arranged on the opposite sides of said toothed ring, disks also arranged on opposite sides of said toothed ring and engaging said friction rings, pins extending through said disks and provided with springs for forcing said disks towards each other, said toothed ring being provided with apertures, projections provided on one of said disks and engageable with said apertures for forming a positive lock between the last mentioned disk and said ring, a hollow shaft fixed to said disks, a plate provided with pins extending through the other disk and engaging one of the disks for forcing the latter away from the disk with which it cooperates, a rod connected to said plate and extending through said shaft, and means for moving said rod axially in order to cause the last mentioned pins to move one of the disks away from the other disk.

In testimony whereof I affix my signature.

KOTARO KOBAYASHI.